United States Patent [19]
Matsuzaki

[11] Patent Number: 5,319,561
[45] Date of Patent: Jun. 7, 1994

[54] APPARATUS FOR ESTIMATING CURRENT HEADING USING MAGNETIC AND ANGULAR VELOCITY SENSORS

[75] Inventor: Shin-ichi Matsuzaki, Osaka, Japan

[73] Assignee: Sumitomo Electric Industries, Ltd., Osaka, Japan

[21] Appl. No.: 818,901

[22] Filed: Jan. 10, 1992

[30] Foreign Application Priority Data

Jan. 21, 1991 [JP] Japan .................................. 3-005389

[51] Int. Cl.5 ............................................. G06F 15/50
[52] U.S. Cl. ................. 364/454; 364/571.02; 340/995
[58] Field of Search .................. 364/454, 571.02, 457, 364/449; 324/207.12; 33/319, 324, 326; 340/988, 995

[56] References Cited

U.S. PATENT DOCUMENTS

| 4,734,863 | 3/1988 | Honey et al. | 364/457 |
| 4,862,398 | 8/1989 | Shimizu et al. | 364/457 |
| 5,115,238 | 5/1992 | Shimizu et al. | 364/449 |
| 5,122,960 | 6/1992 | Ooka | 364/457 |
| 5,235,514 | 8/1993 | Matsuzaki | 364/454 |

Primary Examiner—Thomas G. Black
Assistant Examiner—Michael Zanelli
Attorney, Agent, or Firm—Lane, Aitken & McCann

[57] ABSTRACT

A heading detecting apparatus which calculates a Kalman filter gain by individually analyzing and evaluating error factors contained in the output data of turning angular velocity and magnetic sensors, determines the rate of use of the turning angular velocity and magnetic sensors on the basis of the Kalman filter gain and estimates a current heading of a moving body.

2 Claims, 6 Drawing Sheets

APPARATUS FOR ESTIMATING CURRENT HEADING USING MAGNETIC AND ANGULAR VELOCITY SENSORS

FIELD OF THE INVENTION

The present invention relates to heading (azimuth) detecting apparatus, and more particularly to such an apparatus which detects the heading of the yawing direction of a moving body by the use of a magnetic sensor and a turning angular velocity sensor (e.g., optical fiber gyro, mechanical type gyro, vibration gyro, gas rate gyro) for sensing the turning angular velocity of a moving body.

DESCRIPTION OF THE PRIOR ART

As a method for providing information about the actual location of a vehicle traveling streets, aircraft navigating air routes or ship navigating sea routes, there is known "dead reckoning," in which a distance sensor, a heading sensor (magnetic sensor or turning angular velocity sensor) and a processing unit (e.g., computer) for processing distance and heading data obtained from the distance and heading sensors are employed and the current location data of a moving body are obtained by using an amount of distance change $\delta l$ and a heading $\theta$ (case of the magnetic sensor) or amount of heading change $\delta\theta$ (case of the turning angular velocity sensor). A description of the "vehicle" will hereinafter be given, and in a case where "travel" of the vehicle and "navigation" of the aircraft or ship are used together, the "travel" is used. In the dead reckoning method, the east-west directional component $\delta x$ ($=\delta l \times \cos \theta$) and south-north directional component $\delta y$ ($=\delta l \times \sin \theta$) of the distance change amount $\delta l$ that occurs as the vehicle moves along a street are calculated, and current location output data (Px, Py) are obtained by adding the calculated components $\delta x$ and $\delta y$ to the previous location output data (Px', Py'). However, conventional systems using dead reckoning have their disadvantages in that the accumulation of error occurs due to inherent limitations on the achievable accuracy of the heading sensor.

That is to say, when the heading sensor is a magnetic sensor which senses earth magnetism for obtaining the absolute heading of a moving body, the magnetic sensor senses the feeble intensity of the Earth's magnetic field. Therefore, if the moving body is magnetized, an error will occur in the output data from the magnetic sensor. In order to compensate for this error, the initialization of the magnetic sensor is performed. However, when the moving body passes through regions including magnetic disturbance, such as railroad crossings, places wherein power cables are buried, iron bridges, highways with sound insulating walls and high buildings, the moving body is subjected to the influence of the strong electromagnetic field and therefore the amount of the magnetization of the moving body varies. For this reason, sometimes errors occur again during traveling. Therefore, unless the magnetic sensor output data containing such magnetic disturbance is detected with accuracy and removed, an accurate heading of the moving body cannot be obtained.

When, on the other hand, the turning angular velocity sensor is employed, it is known that errors in the sensor output data will appear frequently at the time that the heading change has become more than a predetermined value, at the time that the power source is turned on, at the time that the vehicle travels at very low speeds or at the time that it is detected that the vehicle is traveling on rough roads such as mountain roads. Unless compensation for that errors is made, the dead reckoned position will become increasingly imprecise or inaccurate.

Then, it has been proposed that both the turning angular velocity sensor and the magnetic sensor are used. If either the turning angular velocity sensor output data or the magnetic sensor output data is reduced in reliability, one data can be compensated for by the other data.

That is to say, in a heading detecting apparatus, in which a current location of a moving body is obtained by reading and storing output data of the turning angular velocity and magnetic sensors and calculating the current heading of the moving body from those sensor output data and from the previous estimated heading, a current estimated heading of the moving body can be obtained by calculating Kalman filter gain in consideration of characteristic errors inherently contained in the output data from the turning angular velocity and magnetic sensors, and by processing the magnetic sensor heading data and the heading data calculated from the turning angular velocity sensor output, with a weight processing method based on the calculated Kalman filter gain. However, in this method, it is important how the characteristic error components contained in the output data from the turning angular velocity and magnetic sensors are evaluated.

That is to say, the individual error components are evaluated by some method and if these are set to constant values, the processing can be most easily performed. However, setting to the constant values is insufficient because the error component in the output of the magnetic sensor is sometimes increased rapidly due to the changes in the magnetized amount during traveling, and it is desirable to evaluate the error components accurately at real time by some method. In addition, since a bias value that is contained in the output data from the turning angular velocity sensor varies with time, it is necessary to take into consideration the error in the turning angular velocity sensor data resulting from that variation. Furthermore, it is also necessary to take the scale factor (output gain) of the turning angular velocity sensor into consideration because sometimes the scale factor departs from a standard value.

The inventor of the present invention has proposed a heading detecting apparatus (Japanese Patent Application No. 1-329851), which measures the output data from the turning angular velocity and magnetic sensors and processes them at real time and is capable of accurately estimating the current heading of a moving body with the aid of the data higher in reliability among the both output data from the turning angular velocity and magnetic sensors. In this apparatus, only dispersion values that are contained in the final output data from the turning angular velocity and magnetic sensors are measured and processing is performed in accordance with the measured dispersion values. Therefore, this apparatus does not take into consideration individual error factors contained in the output data of the turning angular velocity and magnetic sensors.

It is, accordingly, an object of the present invention to provide a heading detecting apparatus which is capable of estimating a current heading of a moving body accurately by individually analyzing and evaluating the error factors contained in the heading data of the magnetic sensor and in the angular velocity data of the turning angular velocity sensor and by determining the rate of use of the output data of the turning angular velocity and magnetic sensors.

SUMMARY OF THE INVENTION

In order to achieve the above object, a heading detecting apparatus of the present invention, as shown in FIG. 1, comprises a magnetic sensor for sensing a heading of a moving body and a turning angular velocity sensor for sensing a heading of the moving body.

First means (A) is connected to the turning angular velocity sensor (43) for measuring an error of a bias value that is contained in an output of the turning angular velocity sensor (43) as the moving body is in its stopped state.

Second means (B) is connected to the first means (A) for calculating a current error that is contained in the output of the turning angular velocity sensor (43), in accordance with the error of the bias value calculated by the first means (A) that is multiplied by an elapsed time after the moving body moves, a change rate of time of the error of the bias value multiplied by the elapsed time, and the output of the turning angular velocity sensor (43) multiplied by an error of a scale factor of the turning angular velocity sensor (43).

Third means (C) is connected to the magnetic sensor (42) for calculating a magnetized amount of the moving body and an error of the magnetized amount from heading data outputted from the magnetic sensor (42) under a predetermined condition as the moving body is in its traveling state.

Fourth means (D) is connected to the third means (C) for calculating a change in the magnetized amount of the moving body and an error of the change from heading data outputted from the magnetic sensor (42) under a predetermined condition as the moving body is in its traveling state.

Fifth means (E) is connected to the fourth means (D) for calculating a current magnetized amount of the moving body and an error of the current magnetized amount in accordance with the magnetized amount of the moving body and the error of the magnetized amount that were calculated by the third means (C) and with the change in the magnetized amount of the moving body and the error of the change that were calculated by the fourth means (D).

Sixth means (F) is connected to the turning angular sensor (43) and to the magnetic sensor (42) for calculating a change in a difference between the heading data of the magnetic sensor (42) and heading data obtained from the output of the turning angular sensor (43).

Seventh means (G) is connected to the fifth means (E) and to the sixth means (F) for calculating an error that is contained in heading data output of the magnetic sensor (42), in accordance with the change in the difference between the heading data of the magnetic sensor (42) and the heading data obtained from the output of the turning angular sensor (43) that was calculated by the sixth means (F) and in accordance with the error of the current magnetized amount of the moving body calculated by the fifth means (E).

Eighth means (H) is connected to the second means (B) and to the seventh means (G) for calculating a Kalman filter gain by calculating a reliability in the output data of each sensor (42, 43) from the error in the output of the turning angular velocity sensor (43) calculated by the second means (B) and from the error of the heading data output of the magnetic sensor (42) calculated by the seventh means (G).

Ninth means (I) is connected to the eighth means (H) for calculating a current estimated heading of the moving body by processing the heading data calculated from the magnetic sensor output and the heading data calculated from the turning angular sensor output with weight processing based upon the Kalman filter gain.

First, an error of a bias value that is contained in the output of the turning angular velocity sensor (43) as the moving body is in its stopped state is calculated by the first means (A). The reason why the data from the turning angular velocity sensor as the moving body is in its stopped state are sampled is that the turning angular velocity sensor output during vehicle's stop contains the bias value only.

Next, based on the error of the bias value calculated by the first means (A) that is multiplied by an elapsed time after the moving body moves, a change rate of time of the error of the bias value multiplied by the elapsed time, and the output of the turning angular velocity sensor (43) multiplied by an error of a scale factor of the turning angular velocity sensor (43), a current error contained in the output of the turning angular velocity sensor (43) is calculated by the second means (B).

Next, by the third means (C), a magnetized amount of the moving body and the error thereof are calculated under a predetermined condition as the moving body is in its traveling state, and by the fourth means (D), a change in the magnetized amount of the moving body and an error of the change are calculated. The "under a predetermined condition" is conditions such as curve travel and the like in which the magnetized amount of the moving body and the error thereof can calculated from the heading data of the magnetic sensor. The reason why the change in the magnetized amount of the moving body is calculated by the fourth means (D) is that the magnetized amount changes due to the above described factors (railroad crossing, etc.)

Next, by the fifth means (E), based on the magnetized amount of the moving body and the error of the magnetized amount that were calculated by the third means (C) and based on the change in the magnetized amount of the moving body and the error of the change that were calculated by the fourth means (D), a current magnetized amount of the moving body and an error of the current magnetized amount are calculated.

And, by the sixth means (F), a change in a difference between the heading data of the magnetic sensor (42) and heading data obtained from the output of the turning angular sensor (43) is calculated. Sometimes a difference occurs between the heading data from the turning angular velocity sensor and the heading data calculated from the magnetic sensor output. However, for a short period of time, that difference is caused by the error in the heading data of the magnetic sensor rather than by the error in the heading data calculated from the angular velocity sensor output, so the difference is thought of as an error in the heading data of the magnetic sensor.

In the seventh means (G), based on the error of the heading data of the magnetic sensor (42) calculated by the sixth means (F) and on the error of the magnetized amount of calculated by the fifth means (E), an error that is contained in heading data output of the magnetic sensor (42) is calculated.

And, with the eighth means (H), a reliability in the output data of each sensor is calculated from the error in the output of the turning angular velocity sensor calculated by the second means (B) and from the error of the heading data output of the magnetic sensor calculated by the seventh means (G), and then a Kalman filter gain is calculated. By the ninth means (I), by processing the heading data calculated from the magnetic sensor output and the heading data calculated from the turning angular sensor output with weight processing based upon the Kalman filter gain, a current estimated heading of the moving body is calculated.

Therefore, the current heading of the moving body can be estimated accurately by individually analyzing and evaluating the error factors contained in the output data of the magnetic and turning angular velocity sensors and by determining the rate of use of the output data of the magnetic and turning angular velocity sensors. Particularly, by taking the error of the gyro scale factor into consideration, the error of the gyro output can be evaluated accurately. Therefore, the Kalman gain, which is the rate of use of the output data of the magnetic and turning angular velocity sensors, can be set a suitable value, so that the vehicle heading can be sensed more accurately. Of course, in addition to the errors described above, various errors, such as an error of quantization at the time of A/D conversion, can be taken into consideration.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 1:
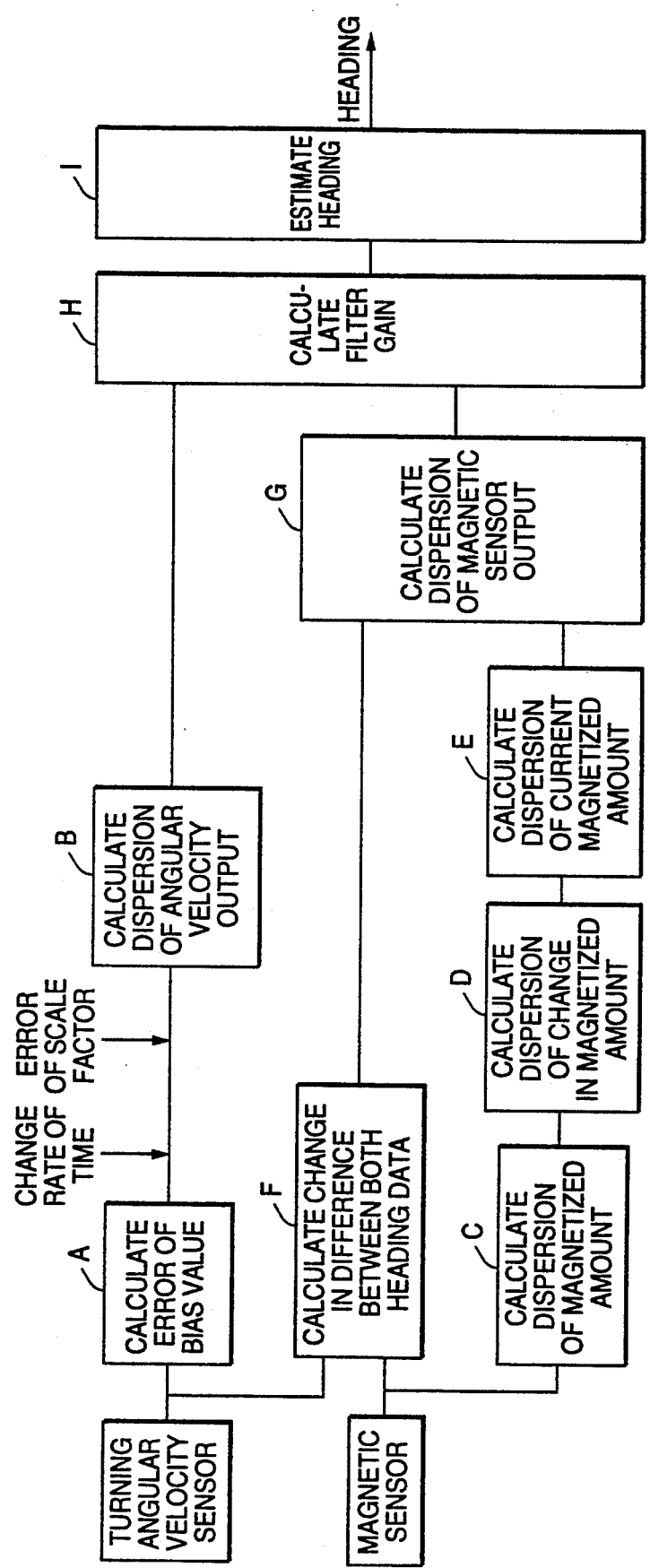
FIG. 1 is a block diagram of a heading detecting apparatus incorporating the principles of this invention.
Figure 2:
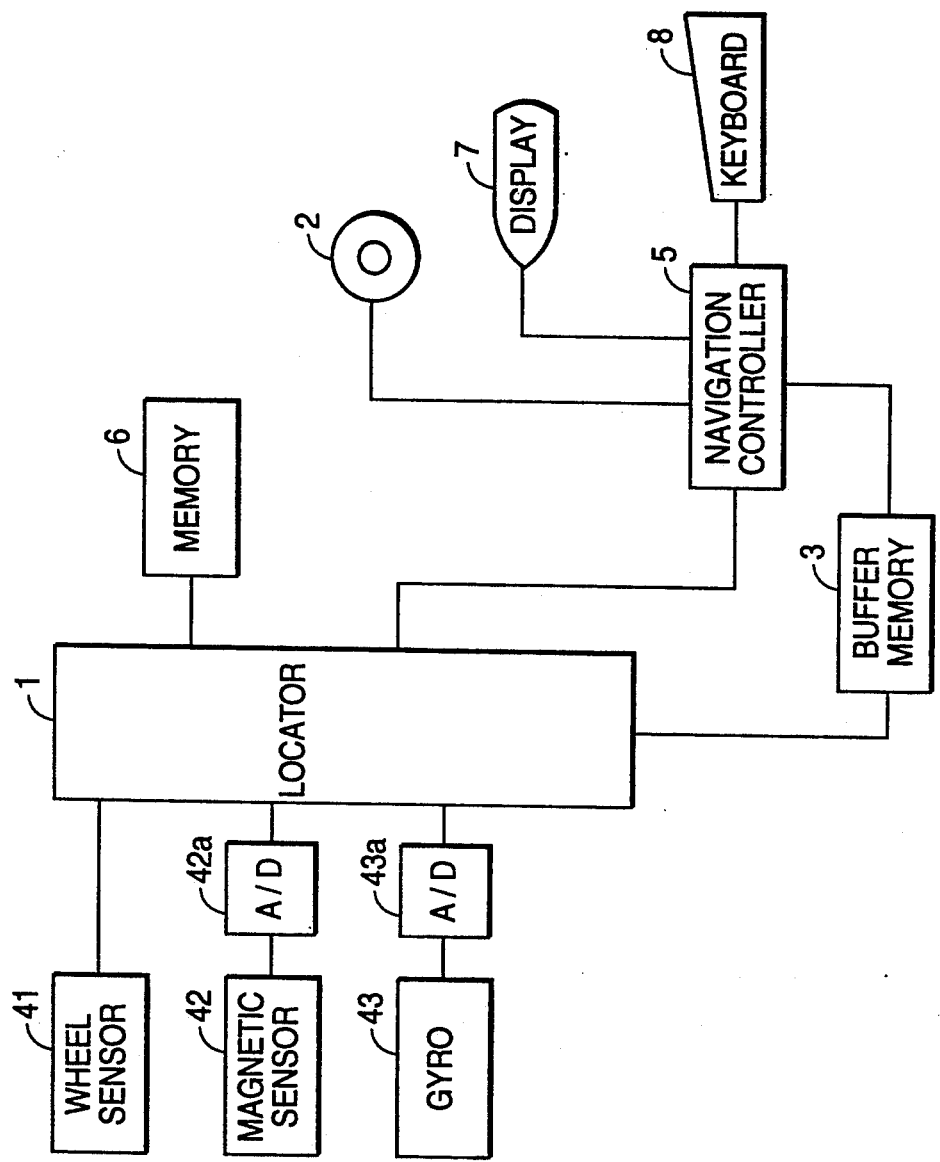
FIG. 2 is a block diagram illustrating one embodiment of the heading detecting apparatus.

FIG. 2 illustrates a preferred embodiment of a heading detecting apparatus of the present invention which may be employed in a vehicle navigational system. The heading detecting apparatus comprises a wheel sensor 41 which senses the number of rotations of the left and right wheels (not shown) respectively of a vehicle (this sensor is used as a distance sensor), a magnetic sensor 42 for sensing the heading of a vehicle, a first A/D (analog-to-digital) converter 42a connected to the magnetic sensor 42, a gyro 43, and a second A/D converter 43a connected to the gyro 43. The gyro 43 is selected from among an optical fiber gyro which reads a turning angular velocity as a phase change of interference light, a vibration gyro which senses a turning angular velocity with the aid of a cantilever vibration technique of a piezoelectric element, and a mechanical type gyro. The gyro 43 is used as a turning angular velocity sensor which senses the heading of a vehicle. The heading detecting apparatus further comprises a road map memory 2 for storing road map data, a locator 1 which calculates an estimated heading of a vehicle in accordance with the output data sensed by the gyro 43 and magnetic sensor 42 and also calculates the location of the vehicle with the aid of the data of the wheel sensor 41, a buffer memory 3 to which the location and heading of the vehicle are inputted, a data memory 6 connected to the locator 1 for storing magnetized amount data that are contained in the data of the magnetic sensor 42 and a dispersion of the magnetized amount data and for storing a gyro bias value that is contained in the data of the gyro and a dispersion of the gyro bias value, a navigation controller 5, a display 7 connected to the navigation controller 5 for displaying on the map the vehicle current location read out of the buffer memory 3, and a keyboard connected to the navigation controller 5.

In the locator 1 described above, the number of rotations of the wheel is obtained by counting the number of the pulses outputted from the wheel sensor 41 with a counter (not shown), and travel distance output data per unit time are calculated by multiplying the count data of the counter by a predetermined constant number indicative of a distance per one count. Also, a relative change in the vehicle heading is obtained from the gyro 43. Then, based on the relative change and the absolute heading output data of the magnetic sensor 42, the locator 1 calculates the heading output data of the vehicle, as will be described below.

The above described road map memory 2 stores road map data of a given area in advance and comprises a semiconductor memory, cassette tape, CD-ROM, IC memory, DAT or the like.

The above described display 7 comprises a CRT display, crystalline liquid display or the like and displays a road map that the vehicle is travelling and a current location of the vehicle.

The above described navigation controller 5 is constituted by a figure processor, an image processing memory and the like, and generates instructions to perform a retrieval of the map on the display 7, switching of scale, scrolling, a display of the vehicle current location and the like.

The above described memory 6 stores a gyro bias value Bo, a gyro bias correction error qo, an estimated change rate $\epsilon$ of the gyro bias error, a noise component N that is contained in the gyro output, a scale factor error A of the gyro (rate of a turning angle measured from the gyro output and an actual turning angle), a magnetized amount $M_n$ of the vehicle, a dispersion value $X_n^2$ of the magnetized amount $M_n$, a magnetized amount change $\delta M_n$, and a dispersion value $Y_n^2$ of the magnetized amount change $\delta M_n$. These values are calculated as follows.

The output data $\delta\theta G$ of the gyro 43 and the output data $\theta H$ of the magnetic sensor 42 are sampled every a constant time. If it is assumed that the time to the current process from the previous process is $\delta t$, the number of samplings will be proportional to the time $\delta t$.

The output data $\delta\theta G$ of the gyro as the vehicle is in its stopped state is normally zero, but it will appear if a bias occurs in the gyro. In estimating this gyro bias value Bo, the value, which has been used during the travel before the vehicle stops, is used as it is. Of course, the gyro output data during vehicle's stop can also be integrated and averaged.

The error qo of the gyro bias value represents what extent of fluctuation the gyro bias value Bo has, and is obtained by reading a plurality of the gyro output data during stop and calculating a dispersion that is contained in that gyro output data.

The estimated change rate $\epsilon$ of the gyro bias error is a value that is obtained from experience as a function of temperature, etc.

The magnetized amount Mn can be obtained by calculating the center of a geomagnetism heading circle from a heading change amount as the vehicle turns and from the output data of the gyro 43 before and after the vehicle turns (see Japanese patent "kokai" publication No. 63-128222).

The dispersion value $Xn^2$ of the magnetized amount Mn is a dispersion value that is contained in the magnetized amount Mn calculated each time the vehicle turns.

The magnetized amount change $\delta Mn$ is a change in the magnetized amount (the moving direction and magnitude of the center of the geomagnetism heading circle) as the vehicle is subjected to a great change of the magnetic field during travel, and $Yn^2$ is a dispersion value of the magnetized amount change $\delta Mn$.

If it is assumed that the previous magnetized amount is M' and the current magnetized amount is M, the magnetized amount change $\delta Mn$ will be calculated by the following equation:

$$\delta Mn = k1 + k2M' + k3M + k4M'M + k5M'^2M^2 - M$$

where k1 to k5 are coefficients, respectively. The coefficients k1 to k5 are calculated based on the data as a specific vehicle was actually magnetized. The dispersion value $Yn^2$ is the remainder as the coefficients k1 to k5 were determined by the above method.

Figure 3:
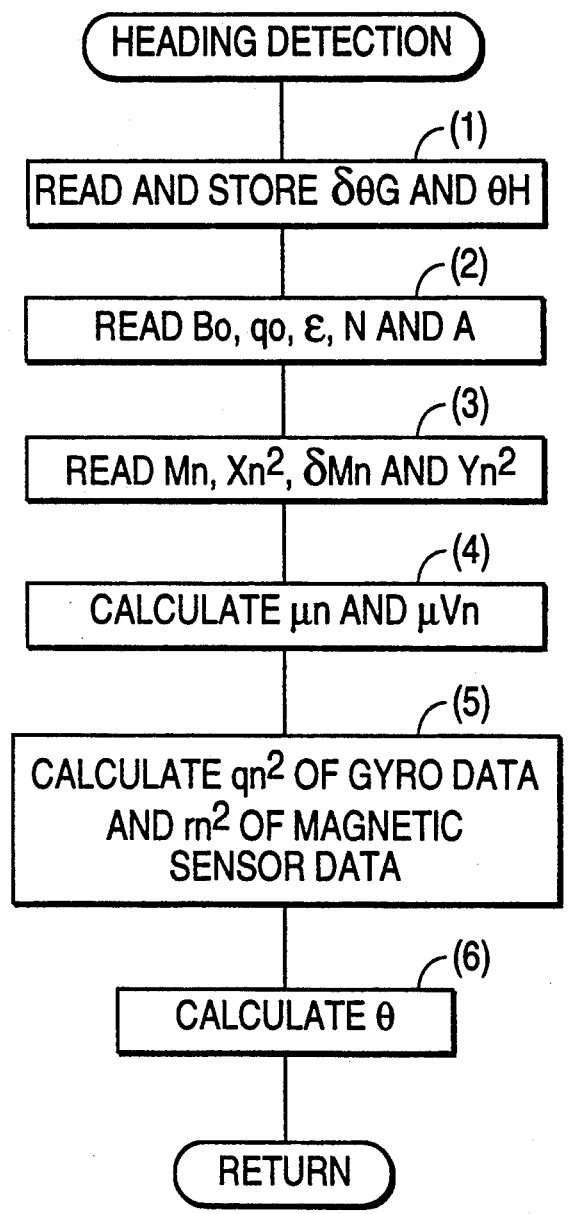
FIG. 3 is a flow chart illustrating a heading detecting sequence.

The vehicle heading detecting sequence by the apparatus constructed as described above will hereinafter be described in detail. During travel, the vehicle location and map are displayed on the display 7 in accordance with the individual sensor output data read and stored in the locator 1. Also, during the display, the data (the number of break-ins is indicated by a subscript n) of the magnetized amount Mn, the dispersion value $Xn^2$, the magnetized amount change $\delta Mn$, and the dispersion value $Yn^2$ are read every a constant time by break-in, and then the vehicle heading is updated. The vehicle heading detecting flow at the time of this break-in is shown in FIG. 3. It is noted that the break-in may also be made every a constant distance that is obtained based on the output data indicative of the distances traveled by the vehicle. The above described constant time or distance is set, depending upon the type of the turning angular velocity sensor and the functional performance of the magnetic sensor.

In step (1), the output data $\delta\theta G$ of the gyro 43 and the output data $\theta H$ of the magnetic sensor 42 are read. Next, in step (2), the gyro bias value Bo, gyro bias error qo, change rate $\epsilon$ of the gyro bias error, noise component N, and the gyro scale factor error A are read out of the data memory 6. In step (3), the magnetized amount Mn, the dispersion value $Xn^2$, the magnetized amount change $\delta Mn$, and the dispersion value $Yn^2$ are read out of the data memory 6. The magnetized amount Mn and the dispersion value $Xn^2$ are obtained only under specific conditions such as curve travel, so the latest values are not always obtained during travel. Therefore, in step (4), based on the magnetized amount change $\delta Mn$ and the dispersion value $Yn^2$, a Kalman filer coefficient an representing a weight ratio of a current estimated amount and the previous estimated amount, a current estimated magnetized amount $\mu n$ and the dispersion value $\mu vn^2$ of $\mu n$ are obtained as follows:

$$\mu n = anMn + (1-an)(Mn-1+\delta Mn)$$

$$an = (Yn^2 + \mu vn-1^2)/(Xn^2 + Yn^2 + \mu vn-1^2)$$

$$\mu vn^2 = anXn^2$$

Then, based on each data that were read out, the current estimated heading of a vehicle is obtained. In order to obtain the current estimated heading, in step (5) the dispersion $qn^2$ of the output data $\delta\theta H$ of the gyro 43 is first calculated by the following equation (I):

$$qn^2 = (qo + \epsilon T)^2 \delta t^2 + N^2 \delta t + A\delta\theta \qquad (I)$$

where T is the time that has elapsed from the previous vehicle's stop, qo is a gyro bias error (containing an error of quantization) which is a constant, $\epsilon T$ is equal to the change rate of the gyro bias error multiplied by the elapsed time T and is an error resulting from a change (drift) of the gyro bias, and $N^2$ is a dispersion caused by noises. The reason that the errors qo and $\epsilon T$ are added up is that these errors are not considered to be an independent phenomenon. If these errors are considered to be an independent phenomenon, then second power of qo and second power of $\epsilon T$ will be added up (Japanese application No. 2-81582). The reason that $\delta t$ is not squared is that the noise error N is proportional to $\frac{1}{2}$ power of the number of additions. $\delta\theta$ is a change between the previous turning angle and the current turning angle, and $A\delta\theta$ is a dispersion of the turning angle caused by the error of the scale factor. The value of A depends on the surrounding temperature and is determined every a certain temperature range as a gyro standard. Therefore, the value of A is used as it is.

Next, the dispersion $rn^2$ of the output data $\theta H$ of the magnetic sensor 42 will be calculated by the following equation:

$$rn^2 = rD^2 + rQ^2 + rL^2 + (tn^2 - \sigma n - 1^2) + r\mu n^2$$

where
 rD = constant part of an error that is contained in the output data $\theta H$ of the magnetic sensor 42,
 rQ = quantization error = $1/(2 \times$ geomagnetism level),
 rL = level error = $0.7 \times |$geomagnetism level difference$|/$estimated value of geomagnetism level,
 $\tau n$ = difference between the heading obtained from the output of the gyro 43 and the heading of the magnetic sensor $42 = (\theta n - 1 + \delta\theta n) - \theta Hn$,
 $\sigma n - 1^2$ = dispersion of the previous estimated heading $\theta n - 1$,
 $\tau n^2 - \sigma n - 1^2$ = dispersion contained in $\tau n$—dispersion of the previous estimated heading $\theta n - 1$ = dispersion that is contained for the first time in the estimated heading, and
 $r\mu n^2$ = dispersion of the heading data of the magnetic sensor resulting from the dispersion of the magnetized amount.

It is noted that it is assumed that the various errors described above arise independently of one another, and the dispersion $rn^2$ is obtained by the sum of dispersion values based on the individual factors.

In step (6), by using $q_n^2$ and $r_n^2$, an estimated heading $\theta$ in which errors are taken into consideration is calculated by the following equation:

$$\theta_n = \beta_n \theta H_n + (1-\beta_n)(\theta_{n-1} + \delta\theta G_n)$$

where
$\theta$ is a current heading, $\theta_{n-1}$ is the previous heading, $\delta\theta G_n$ and $\theta H_n$ are sensor output data that are used as the current heading is calculated, and $\beta_n$ is a Kalman gain which is a variable of $0 < \beta < 1$. By using the previous Kalman gain $\beta_{n-1}$, $\beta_n$ is obtained by the following equation:

$$\beta_n = (q_n^2 + \sigma_{n-1}^2)/(q_n^2 + r_n^2 + \sigma_{n-1}^2)$$

The dispersion of the estimated heading is calculated by the following equation:

$$\sigma_n^2 = \beta_n r_n^2$$

As described above, the mean and dispersion of the gyro bias estimated value, the error of the change rate of that estimated value, the noise component, the error of the gyro scale factor, the mean and dispersion of the magnetized amount contained in the magnetic sensor output, and the mean and dispersion of the change amount of that magnetized amount have been calculated and stored. Then, when calculating the estimated heading of a vehicle, the dispersions that are contained in the output data of the gyro and magnetic sensor are respectively calculated from the aforesaid stored data, and an estimated heading can be obtained based on the data that have been weighted. From this estimated heading and the distance data of the wheel sensor 41, the estimated location of a vehicle can be calculated. At this point, it is a matter of course that a map matching method may be used which compares an estimated location with road map, evaluates a degree of correlation with respect to road map data, corrects the estimated location and displays the current location of a vehicle on roads (Japanese patent "kokai" publication Nos. 63-148115 and 64-53112).

Figure 4:
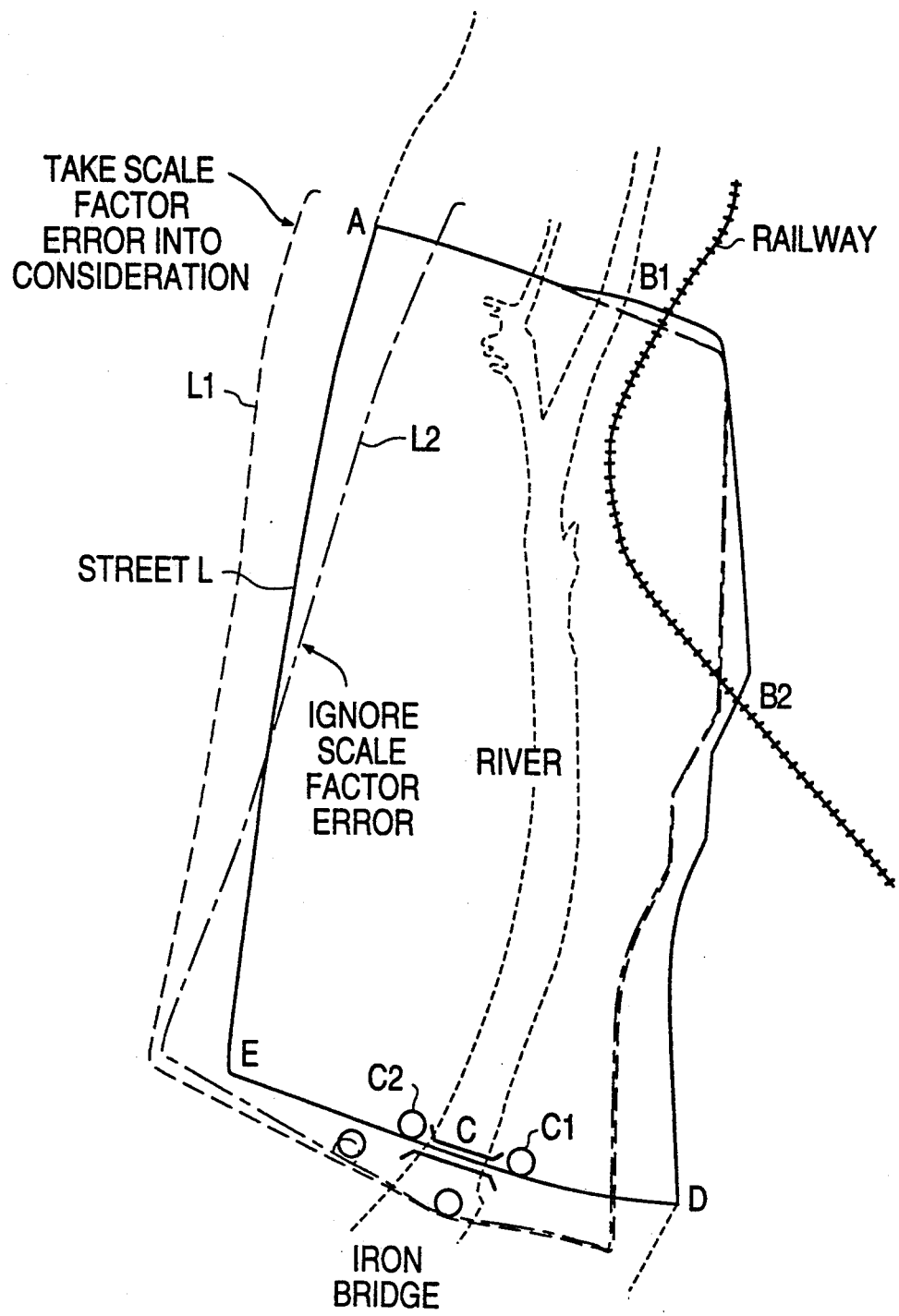
FIG. 4 is a diagram showing the travel track of a vehicle obtained with the aid of the heading detecting apparatus of the present invention.

FIG. 4 illustrates the travel track of a vehicle that was obtained using the heading detecting apparatus described above. The vehicle starts from an A point and passes through railroad crossings B1, B2 and through corners D, E and returns back to the A point. Before and after the vehicle passes through an iron bridge C, it travels loops C1 and C2. The actual roads on the map are indicated by the solid line L of FIG. 4. The travel track obtained by the heading detecting apparatus of the present invention is indicated by the broken line L1. The travel track obtained by the following equation (II) in which the error A of the gyro scale factor is not taken into consideration is indicated by the one-dot chain line L2 (it is noted that Japanese patent application No. 2-81582 discloses equation in which the noise component N is ignored and the errors qo and $\epsilon T$ are independent from each other, but it is essentially identical to equation (II)).

$$q_n^2 = (q_o + \epsilon T)^2 \delta t^2 + N^2 \delta t \quad \text{(II)}$$

As shown in FIG. 4, the travel track is departed from the actual road at the railroad crossing B1, but this is due to an error in the initial heading.

Figure 5:
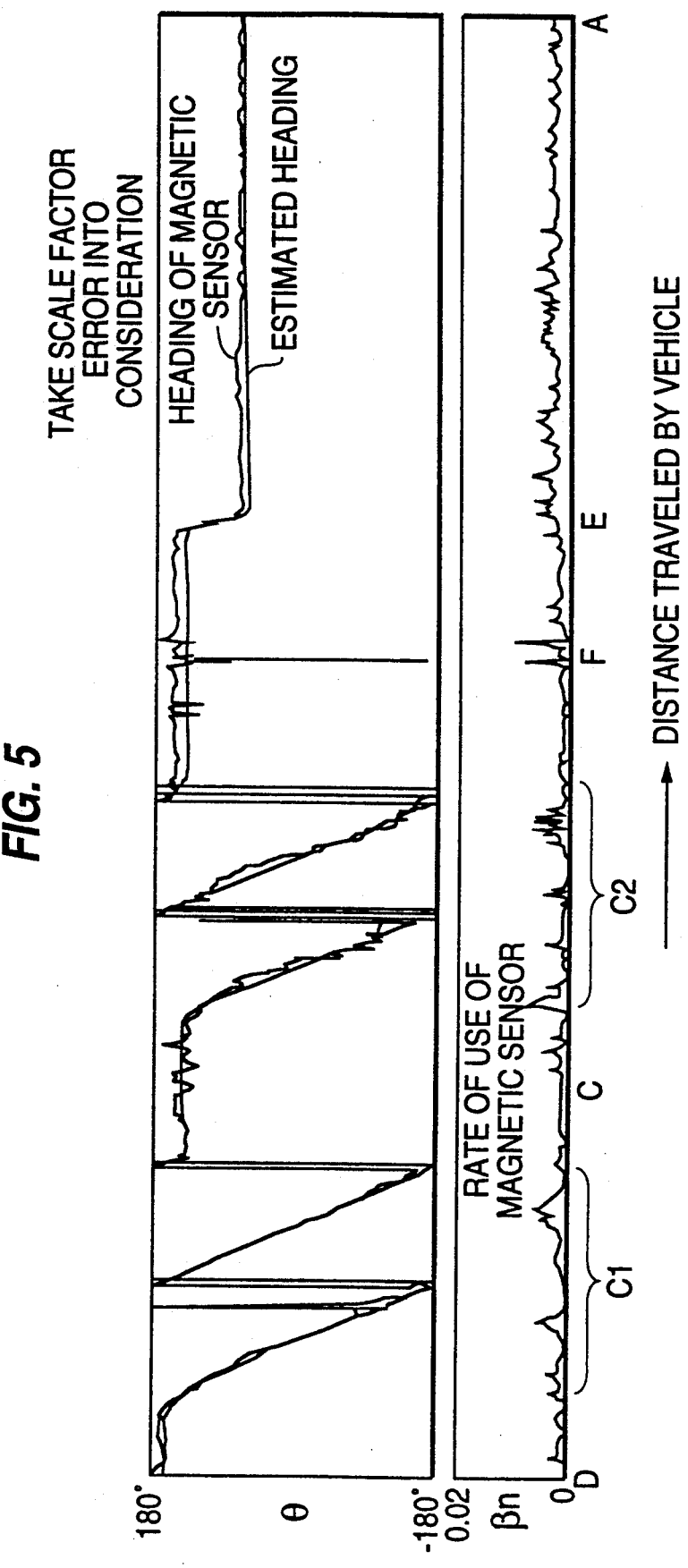
FIG. 5 is a graph illustrating a change in the heading during travel as the error of a gyro scale factor is taken into consideration and illustrating the rate of use of magnetic sensor data.
Figure 6:
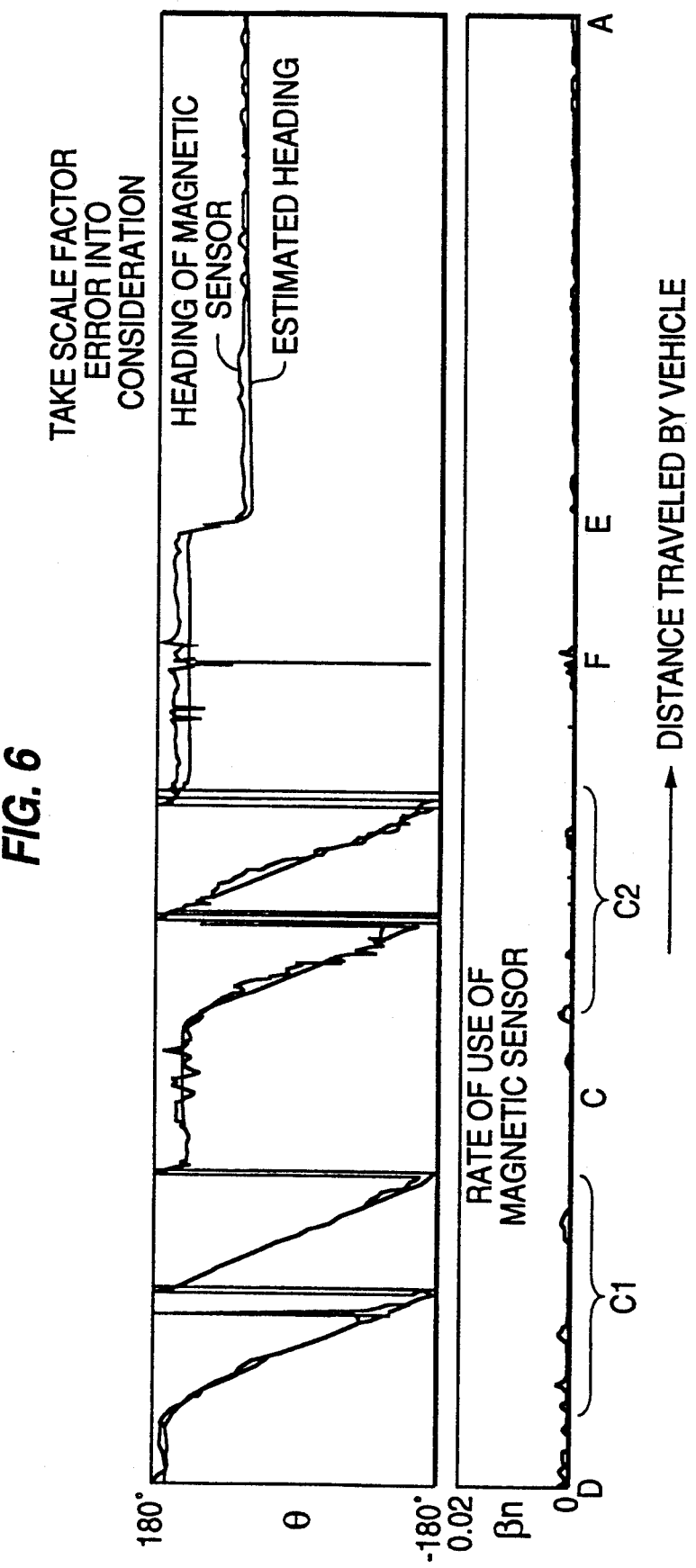
FIG. 6 is a graph illustrating a change in the heading during travel as the error of a gyro scale factor is not taken into consideration and illustrating the rate of use of magnetic sensor data.

FIG. 5 illustrates the estimated heading $\theta$ obtained by the above described equation (I) in which the error A of the gyro scale factor is taken into consideration, the heading based on the magnetic sensor, and the rate of use $\beta_n$ (Kalman gain) of the magnetic sensor data. FIG. 6 illustrates the estimated heading $\theta$ obtained by the above described equation (II) in which the error A of the gyro scale factor is not taken into consideration, the heading based on the magnetic sensor, and the rate of use $\beta_n$ (Kalman gain) of the magnetic sensor data. The abscissas of FIG. 5 represents the distances traveled along the D, E and A points of FIG. 4 by the vehicle. Likewise, the abscissas of FIG. 6 represents the distances traveled along the D, E and A points.

The travel of the vehicle along the track L1 of FIG. 4 is first explained in conjunction with FIG. 5. When the vehicle travels over the loop C1 after it traveled the point D, the estimated heading $\theta$ repeats a change to 180° from −180° two times. That is, the estimated heading $\theta$ changes 360° along the loop C1. And, when the vehicle travels the iron bridge C, the noise component is slightly increased. When the vehicle travels over the next loop C2, the estimated heading $\theta$ repeats a change to 180° from −180° two times. At the F point, the vehicle undergoes extrinsic noises. After the vehicle travels the corner E, the direction of the vehicle changes to about right angles, so a constant change has arisen in the estimated heading $\theta$.

The difference between the tracks L1 and L2 will hereinafter be explained in conjunction with FIG. 6. As compared with FIG. 5, the difference is that the estimated heading after the E point is different, the rate of use $\beta_n$ of the magnetic sensor is low, and a difference between the heading of the magnetic sensor and the estimated heading is large.

The reason that the rate of use $\beta_n$ is low can be considered as follows. When equation (II) is used, the error A of the gyro scale factor is not taken into consideration, so the errors contained in the gyro output are evaluated to be smaller than actual errors. That is, since the reliability in the gyro output is evaluated to be higher than actual reliability, so that the rate of use of the magnetic sensor output is reduced. For this reason, the difference between the heading of the magnetic sensor and the estimated heading becomes large. However, when equation (I) is used, the error A of the gyro scale factor is taken into consideration, so the reliability in the gyro output is not overestimated. Therefore, the rate of use $\beta_n$ of the magnetic sensor becomes higher. And, as a result of the reliability in the gyro output being evaluated correctly, the difference between the heading of the magnetic sensor and the estimated heading becomes smaller, and the estimated heading of the vehicle after the E point is more accurate than that obtained by equation (II). This is clear by the fact that in FIG. 4, the track L1 between the E and A points is parallel to the actual road L. Accordingly, when the reliability in the gyro output is evaluated, the accuracy in the detected heading can be considerably increased by taking the gyro scale factor error A into consideration.

While the subject invention has been described with relation to the preferred embodiment, various modifications and adaptations thereof will now be apparent to those skilled in the art. For example, the noise component contained in equation (I) can be ignored.

What I claim is:
1. In a navigation system comprising:
   a magnetic sensor for sensing a heading of a moving body;

a turning angular velocity sensor for sensing a heading of said moving body;

a locator connected to said turning angular velocity sensor and said magnetic sensor for determining a current estimated heading of said moving body from said magnetic sensor output and from said turning angular velocity sensor output, a navigation controller responsive to the current heading determined by said locator to determine the current location of said moving body with respect to a map, and means to display the location of said moving body on said map, the improvement wherein said locator comprises:

first means connected to said turning angular velocity sensor for measuring an error of a bias value that is contained in an output of said turning angular velocity sensor as said moving body is in its stopped state;

second means connected to said first means for calculating a current error that is contained in the output of said turning angular velocity sensor, in accordance with said error of said bias value measured by said first means that is multiplied by an elapsed time after said moving body moves, a change rate of time of said error of said bias value multiplied by said elapsed time, and the output of said turning angular velocity sensor multiplied by an error of a scale factor of said turning angular velocity sensor;

third means connected to said magnetic sensor for calculating a degree of magnetization of said moving body and an error of said degree of magnetization from heading data outputted from said magnetic sensor under a predetermined condition as said moving body is in its traveling state;

fourth means connected to said third means for calculating a change in said degree of magnetization of said moving body and an error of said change from heading data outputted from said magnetic sensor under said predetermined condition as said moving body is in its traveling state;

fifth means connected to said fourth means for calculating a current degree of magnetization of said moving body and an error of said current degree of magnetization in accordance with said degree of magnetization of said moving body and said error of said degree of magnetization that were calculated by said third means and with said change in said degree of magnetization of said moving body and said error of said change that were calculated by said fourth means;

sixth means connected to said turning angular sensor and to said magnetic sensor for calculating a change in a difference between the heading data of said magnetic sensor and heading data obtained from the output of said turning angular sensor;

seventh means connected to said fifth means and to said sixth means for calculating an error that is contained in heading data output of said magnetic sensor, in accordance with said change in said difference between the heading data of said magnetic sensor and the heading data obtained from the output of said turning angular sensor that was calculated by said sixth means and in accordance with said error of the current degree of magnetization of the moving body calculated by said fifth means;

eighth means connected to said second means and to said seventh means for calculating a Kalman filter gain by calculating a reliability in the output data of each sensor from said error in the output of said turning angular velocity sensor calculated by said second means and from said error of said heading data output of said magnetic sensor calculated by said seventh means; and ninth means connected to said eighth means for calculating a current estimated heading of said moving body by processing the heading data calculated from the magnetic sensor output and the heading data calculated from the turning angular velocity sensor output with weight processing based upon said Kalman filter gain.

2. A heading detecting apparatus as set forth in claim 1, wherein said moving body is a vehicle.

* * * * *